Aug. 10, 1948.  V. G. VAUGHAN ET AL  2,446,677
HEATING CONTROL SYSTEM
Filed April 25, 1945  2 Sheets-Sheet 1
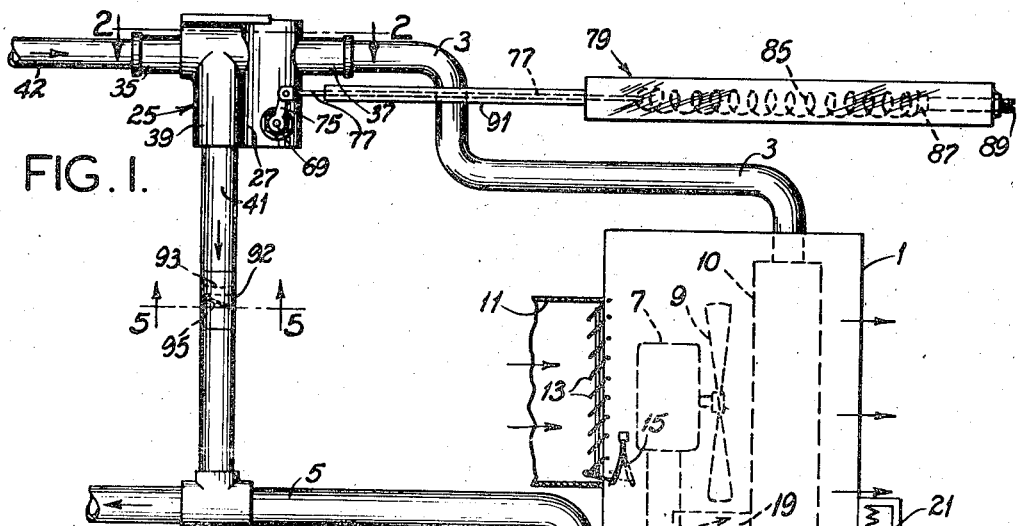
FIG. 1.
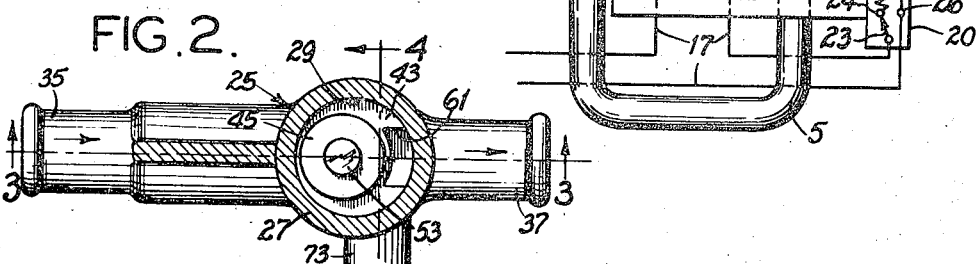
FIG. 2.
FIG. 3.
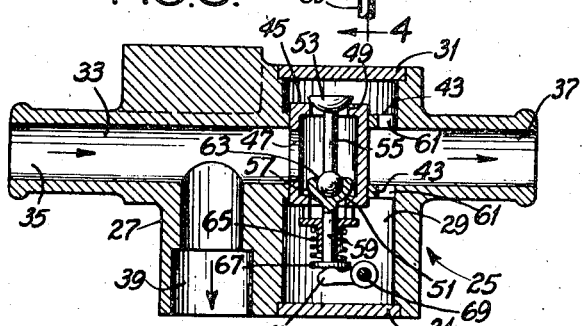
FIG. 4.
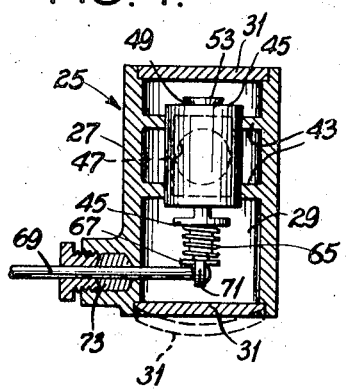
FIG. 5.  FIG. 6.
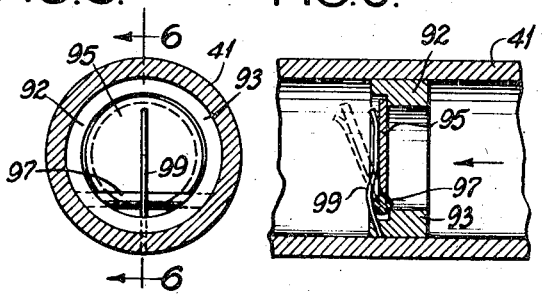
Victor G. Vaughan
John O. Moorhead
Inventors
Haynes and Koenig
Attorneys Aug. 10, 1948.   V. G. VAUGHAN ET AL   2,446,677
HEATING CONTROL SYSTEM
Filed April 25, 1945   2 Sheets-Sheet 2
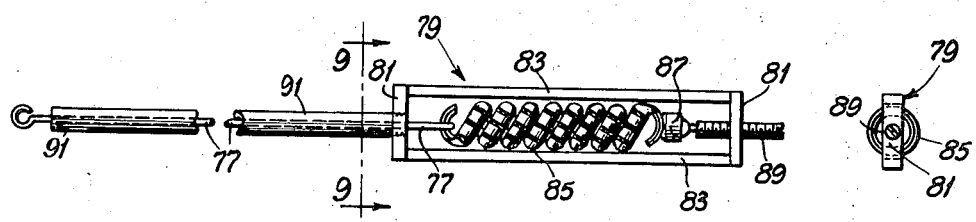
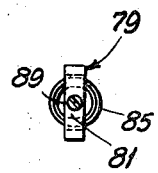
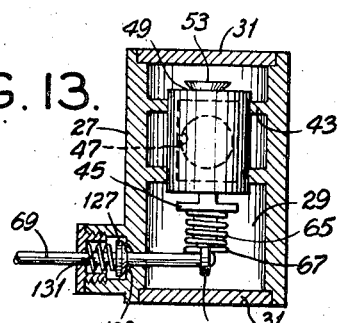
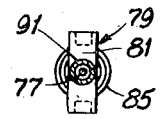
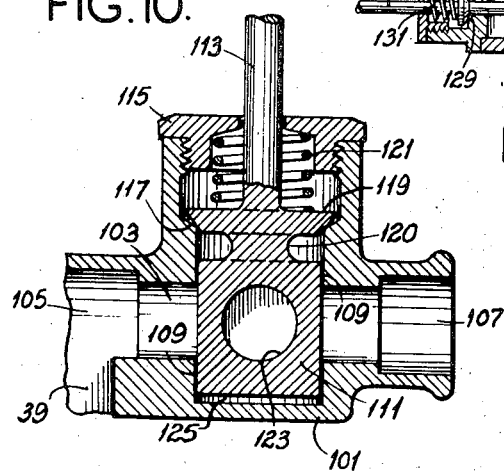
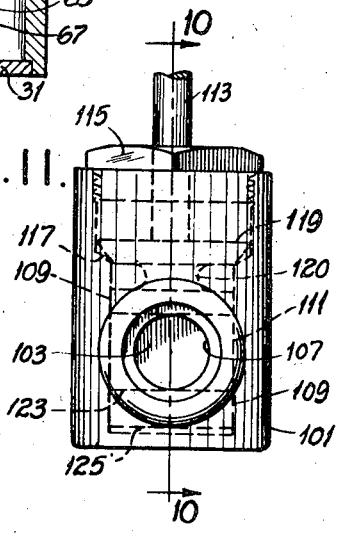
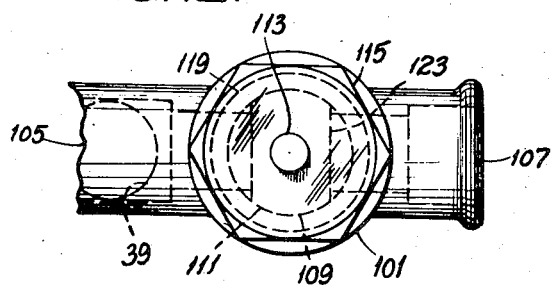

Patented Aug. 10, 1948

2,446,677

UNITED STATES PATENT OFFICE 2,446,677

HEATING CONTROL SYSTEM

Victor G. Vaughan and John O. Moorhead, Attleboro, Mass., assignors to Metals and Controls Corporation, Attleboro, Mass., a corporation of Massachusetts Application April 25, 1945, Serial No. 590,200

9 Claims. (Cl. 237—8)

This invention relates to heating control systems and more particularly to thermostatically controlled heating systems.

Among the objects of this invention are the provision of a heating control system which automatically varies the heat input in accordance with the temperature of a space to be heated; the provision of a heating control system which substantially avoids overheating the heated area; the provision of a heating control system which is inexpensive and easily installed; the provision of a heating control system which is of particular advantage for use with automobile heating systems; and, the provision of a heating system of the type indicated which may be inexpensively installed in automobiles to efficiently control the heat input to the car. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings in which are illustrated several of various possible embodiments of the invention:

Fig. 1 is a diagram of a heating system of the present invention;

Fig. 2 is a section taken on line 2—2 in Fig. 1;
Fig. 3 is a section taken on line 3—3 in Fig. 2;
Fig. 4 is a section taken on line 4—4 in Fig. 2;
Fig. 5 is a section taken on line 5—5 in Fig. 1;
Fig. 6 is a section taken on line 6—6 in Fig. 5;
Fig. 7 is a side elevation of the main thermal element in the system of Fig. 1;
Fig. 8 is a right-end elevation of the Fig. 7 element;
Fig. 9 is a section taken on line 9—9 in Fig. 7;
Fig. 10 is a view similar to Fig. 3 but showing modification of the control valve shown in Fig. 3;
Fig. 11 is a right-end elevation of the Fig. 10 valve;
Fig. 12 is a top plan of the Figs. 10 and 11 valve; and,
Fig. 13 is a view similar to Fig. 4 but illustrating a different operating member for the main valve.

Similar reference characters indicate corresponding parts throughout the several views of the drawings.

The heating control systems of the present invention are of particular value for use with automobile heating systems, wherein flow of heat-exchange fluid is subject to variations and their use will be illustrated primarily for this purpose. It will be understood, however, that heating control systems of the present invention may be usefully employed for controlling other heating systems, such as hot air and hot water heating units for buildings.

The usual method for heating automobiles has been to tap the cooling system of the engine and circulate part of the heated cooling liquid through a heater. A fan forces air through the heater and around the occupants of the car. With this arrangement the temperature of the automobile interior varies considerably. Some measure of control is provided by a variable speed switch on the fan but this provides only a few heating rates and requires manual operation.

In accordance with the present invention the flow of hot water through the heater is controlled in accordance with a predetermined temperature setting for the interior of the car irrespective of the temperature of the engine cooling water.

Referring now to the drawings, in Fig. 1 is shown diagrammatically, a heater 1 of the conventional type having a water inlet pipe 3 constituting a supply conduit connected to the upper end of the heater and an outlet pipe 5 constituting a return conduit connected to the bottom of the heater.

A motor 7 and fan 9 force air over the heater core 10 constituting the heat exchanger of unit heater 1 and toward the car occupants in the direction indicated by the arrows.

A source of fresh air for the fan is obtained from a duct 11, leading from the exterior of the automobile body. Louvers 13 regulate the intake under control of a bimetal strip thermostatic element 15 so that after a predetermined car temperature is reached, thermostatic element 15 will warp toward its solid line position (Fig. 1) to open louvers 13 admitting fresh air to the heater. Element 15 is located so as to respond to car temperature.

The wiring circuit 17 to the fan motor 7 includes a thermostatic switch 19 which makes or breaks the circuit 17 to the fan in response to the temperature of the water flowing through the core of the heater 1. Switch 19 is set to remain open until the water temperature is high enough so fan 9 blows warm air from heater 1.

Also in circuit 17 is a switch 20 which includes a resistance 21 which is in circuit causing motor 7 to run slowly until the air from heater 1 is quite warm, after which a thermostatic element 23 trips from a contact 24 on resistance 21 to a contact 26. This eliminates resistance 21 from the circuit and brings fan motor 7 up to speed.

A valve 25 is the primary control for the heat output of heater 1. Valve 25 includes a case 27 containing a valve chamber 29. This valve chamber is cored through case 27 vertically and is closed at top and bottom by pressed-in discs or Welsh plugs 31. This simplifies the construction and speeds the assembly of the interior parts of the valve. Once the parts are assembled and adjusted, discs 31 are put in place (as shown by dotted lines for the lower disc in Fig. 4) and pressed home providing a leak-proof joint, unaffected by vibration.

A horizontal passage 33 through case 27 includes an inlet 35 and an outlet 37 from valve chamber 29. At the inlet side of valve chamber 29 is a by-pass 39 to which is connected in any suitable manner a pipe 41. Pipe 41 is also connected to return or outlet pipe 5 of heater 1. Inlet 35 is connected to a pipe 42 which in turn is connected to a hot-water discharge part of the cooling system for the automobile engine. Pipe 3 connects outlet 37 of passage 33 to the inlet to heater 1.

Mounted vertically and supported by webs 43 is a secondary valve chamber 45 containing an inlet hole 47, a top valve seat 49 and a lower valve seat 51. The openings through the seats 49 and 51 are equal. A valve 53 on a stem 55 seats against the top valve seat 49 while a second valve 57 on a stem 59 seats against the bottom valve seat 51. These valves cut off the passage of liquid between inlet 35 and outlet 37 by way of the holes 61 in webs 43. Valve stem 55 of valve 53 has a ball and socket connection 63 with valve 57. This construction aligns the two valves in their closed positions (see Fig. 3). A light return spring 65 bears against a head 67 on stem 59 and exerts a slight seating pressure for valves 53 and 57. In view of the equal areas of the valve openings, the valves 53 and 57 are hydraulically balanced.

A cam finger 71 on a rotatable shaft 69 bears against head 67. Rotatable shaft 69 is supported in a bearing 73 in case 27. On the outside of case 27 it is attached to a lever 75 which is loosely pinned at its opposite end to the movable stem 77 of a temperature responsive device 79. This temperature responsive device 79 is located within the automobile body.

Secondary valve chamber 45 is an equalizing chamber wherein the fluid pressure from inlet 35 is divided between the two valves 53 and 57. Because of this balanced condition very little force is required to open or close valves 53 and 57.

The temperature responsive device 79 includes a thermostatic element 85 of the type described in Parsons Patent 2,121,259, mounted between the ends 81 of an open frame work 83. Thermostatic element 85 consists of bimetallic material wound along a minor helix and the resulting minor-wound material is then wound along a major helix. The bimetallic member so made will expand and contract in the direction of the axis of the major helix when the temperature of the element 85 is changed as in response to changes in the atmospheric temperature of the interior of the automobile. Element 85 is constructed to expand axially when heated.

Any rotation of the element 85 about its major axis during expansion or contraction is nullified by a ball and socket connection 87 to an adjusting screw 89 mounted in one end 81 of the frame 83. The other end of element 85 is connected to stem 77. A bearing tube 91 allows the stem 77 to move freely in response to longitudinal movement of the element 85 to shift the cam finger 71 and shaft 69, thereby opening or closing valves 53 and 57.

A check valve 92 is located in by-pass pipe 41 (see Figs. 1, 5 and 6). Check valve 92 consists of a valve seat ring 93 pressed into by-pass pipe 41 and a butterfly type valve 95 pivoted at 97 to the ring 93. Pressure tending to open the valve is resisted by a light wire spring 99. Check valve 92 can be inexpensively constructed since it need not close off by-pass 41 completely and the alignment of parts need not be perfect.

The operation of the control system is as follows. Assume that the interior of the automobile is cold and the engine has just been started. Element 85 has been contracted with cold, pressing finger 71 against head 67 and opening valves 53 and 57 against spring 65. Check valve 92, at low pressure when the thermostat 85 is calling for heat, directs the flow of cooling fluid from the engine into heater 1. Thus during the initial warming up period, if pressures are low, spring 99 holds valve 95 closed, cutting by-pass 41 out of the circuit. When valves 53 and 57 are closed, there is sufficient pressure available to force open valve 95, and the fluid is by-passed through 41. The amount of by-passing in all cases will depend on the amount of pressure in the system, and the amount of opening in valves 53 and 57.

After the cooling fluid flowing through heater 1 has become sufficiently warm, thermostat 19 closes the electrical circuit to fan motor 7. The fan will run slowly at first because resistance 21 is in the circuit but as the cooling fluid becomes warmer, resistance 21 will be shunted out and the fan will increase in speed. Meanwhile if the engine is driving the pump for the cooling fluid at a high rate, check valve 95 will open proportionately to allow the excess liquid to by-pass valves 53 and 57. This prevents "fluttering" of valves 53 and 57 under periodic pressure impulses from the cooling fluid pump. As the temperature in the car rises, thermostatic element 15 moves to open louvers 13 admitting fresh air from the exterior to be warmed by passing through the heater and circulated by fan 9. As the temperature rises, element 85 expands. This expansion tends to move finger 71 away from head 67 permitting spring 65 to close valves 53 and 57 proportionately. As this happens more and more of the cooling fluid will be passed into pipe 41, the check valve 95 opening to a greater extent to accommodate the added flow. Likewise as less water flows through the heater, the fan will be able to send less heat into the car and a predetermined temperature for the interior of the car will be reached.

An alternative form of valve to replace the mushroom-type valve shown in Figs. 2-4, is illustrated by Figs. 10, 11 and 12. The alternative valve is of a rotary gate type and also embodies the advantages stated for the previously described form.

The Figs. 10-12 valve comprises a body 101 with a cross passage 103. Inlet 105 and outlet 107 provide connections to the cooling system of an automobile. A by-pass connection 39 joins passage 103.

Traversing the passage 103 at right angles is a seat 109 for the gate 111. An actuating stem 113 extends from gate 111. It need not have a perfect fit in the screw cap 115. Stem 113 has a head 119 which rests on a seat 117 and is integrally connected to gate 111 by neck 120. A spring 121 reacts against cap 115 and head 119 forming a leak-proof seal which exerts very little friction against rotary movement of head 119 on seat 117. A bore 123 through gate 111 provides a passage for the fluid through the valve when the former is in axial alignment with openings 105 and 107. Clearance is provided at 125 so that any wearing of the sealing surface may be taken up automatically by spring 121.

Gate 111 and body 101 do not fit closely, thus eliminating friction at this point.

In lieu of thermostatic element 85, other types of creep-acting thermostatic elements can be substituted. Thermostatic elements 23, 15 and 19 may be of any desired type, either creep-acting or snap-acting.

Fig. 13 illustrates an alternative form for the main valve. In this instance shaft 69 is expanded at 127 to form a sealing member seating against a seal seat 129 formed in case 27. A spring 131 presses member 127 toward seating position. The Fig. 13 construction is more easily operated than the analogous construction shown in Fig. 4, since the combination of sealing member 127 and seat 129 exerts relatively little resistance toward movement of shaft 69 and therefore of finger 71.

Where the pressure in the cooling system of the automobile is relatively high at low idling speeds, the check valve may be omitted from the system. The system without the check valve works satisfactorily except at low pressures, and where there is no substantial period of low pressure the by-pass valve may be omitted.

Although the present invention has been described particularly as applied to heating control system for an automobile, it may be used for controlling other heating systems such as hot air and hot water heating units for buildings.

In certain cases if desired, one or all of the following, with their functions, may be omitted from the control system of the present invention: The duct and control mechanism for admitting outside air, the thermostat 19 and the electrical resistance.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. A heating control system comprising a unit heater for heating a space, said heater including a heat exchanger, a conduit for supplying heated fluid to said exchanger from a variable-flow source thereof, a conduit for returning fluid from said exchanger to said source, valve means in said supply conduit for controlling flow of fluid to said exchanger, and by-pass means connecting said supply and return conduits and connected into said supply conduit at a point between said source and said valve means, flow through said by-pass means being determined by the pressure in said supply conduit between said source and valve means.

2. A heating control system comprising a unit heater for heating a space, said heater including a heat exchanger, a conduit for supplying heated fluid to said exchanger from a variable-flow source thereof, a conduit for returning fluid from said exchanger to said source, valve means in said supply conduit for controlling flow of fluid to said exchanger, by-pass means connecting said supply and return conduits and connected into said supply conduit at a point between said source and said valve means, flow through said by-pass means being determined by the pressure in said supply conduit between said source and valve means, and means responsive to the temperature of the air in said space for operating said valve means.

3. A heating control system comprising a unit heater for heating a space, said heater including a heat exchanger, a conduit for supplying heated fluid to said exchanger from a variable-flow source thereof, a conduit for returning fluid from said exchanger to said source, valve means in said supply conduit for controlling flow of fluid to said exchanger, a by-pass connecting said supply and return conduits and connected into said supply conduit at a point between said source and said valve means, and a check valve in said by-pass adapted to open to permit flow therethrough in response to increase of pressure in said supply conduit between said source and said valve means.

4. A heating control system comprising a unit heater for heating a space, said heater including a heat exchanger, a conduit for supplying heated fluid to said exchanger from a variable-flow source thereof, a conduit for returning fluid from said exchanger to said source, valve means in said supply conduit for controlling flow of fluid to said exchanger, a by-pass connecting said supply and return conduits and connected into said supply conduit at a point between said source and said valve means, a check valve in said by-pass adapted to open to permit flow therethrough in response to increase of pressure in said supply conduit between said source and said valve means, and means responsive to the temperature of the air in said space for operating said valve means.

5. A heating control system comprising a unit heater for heating a space, said heater including a heat exchanger, a conduit for supplying heated fluid to said exchanger from a variable-flow source thereof, a conduit for returning fluid from said exchanger to said source, valve means in said supply conduit for controlling flow of fluid to said exchanger, and by-pass means connecting said supply and return conduits and connected into said supply conduit at a point between said source and said valve means, whereby flow through said by-pass means is determined by the pressure in said supply conduit between said source and said valve means, said valve means comprising a plurality of valves exposed to pressure of fluid in opposite directions so as to be substantially balanced hydraulically.

6. A heating control system comprising a unit heater for heating a space, said heater including a heat exchanger, a conduit for supplying heated fluid to said exchanger from a variable-flow source thereof, a conduit for returning fluid from said exchanger to said source, valve means in said supply conduit for controlling flow of fluid to said exchanger, and by-pass means connecting said supply and return conduits and connected into said supply conduit at a point between said source and said valve means, whereby flow through said by-pass means is determined by the pressure in said supply conduit between said source and said valve means, said valve means comprising a valve chamber, a reciprocating valve therein, and means for moving said valve including a rotary shaft extending from said chamber and a seal for said shaft.

7. A heating control system comprising a unit heater for heating a space, said heater including a heat exchanger, a conduit for supplying heated fluid to said exchanger from a variable-flow source thereof, a conduit for returning fluid from said exchanger to said source, valve means in said supply conduit for controlling flow of fluid to said exchanger, and by-pass means connecting said supply and return conduits and connected into said supply conduit at a point between said source and said valve means, flow through said by-pass means being determined by the pressure in said supply conduit between said source and valve means, said valve means comprising a valve chamber, a reciprocating valve therein, means for moving said valve including a rotary and axially movable shaft extending from said chamber, a sealing member on said shaft, and means biasing said shaft axially to engage said sealing member against a seat on said chamber.

8. A heating control system comprising a unit heater for heating a space, said heater including a heat exchanger, a conduit for supplying heated fluid to said exchanger from a variable-flow source thereof, a conduit for returning fluid from said exchanger to said source, valve means in said supply conduit for controlling flow of fluid to said exchanger, and by-pass means connecting said supply and return conduits and connected into said supply conduit at a point between said source and said valve means, flow through said by-pass means being determined by the pressure in said supply conduit between said source and valve means, said valve means comprising a valve chamber, a rotary valve in said chamber, an actuating stem extending from said chamber, and a rotary seal for said stem.

9. A heating control system comprising a unit heater for heating a space, said heater including a heat exchanger and an electric fan for blowing air therethrough, a conduit for supplying heated fluid to said exchanger from a variable flow source thereof, a conduit for returning fluid from said exchanger to said source, valve means in said supply conduit for controlling flow of fluid to said exchanger, a by-pass connecting said supply and return conduits and connected into said supply conduit at a point between said source and said valve means, means responsive to temperature of air in said space for operating said valve means, means responsive to temperature of air in said space for controlling the supply of air to said heater, means responsive to temperature of said exchanger adapted to energize said fan above a predetermined temperature and to deenergize it below that temperature, and means responsive to temperature of said exchanger for controlling the speed of said fan.

VICTOR G. VAUGHAN.
JOHN O. MOORHEAD.

REFERENCES CITED

The following references are of record in the file of this patent:

UNITED STATES PATENTS

| Number | Name | Date |
|---|---|---|
| 1,583,238 | Scudder | May 4, 1926 |
| 1,919,743 | Peters | July 25, 1933 |
| 2,019,991 | Nilson | Nov. 5, 1935 |
| 2,098,252 | Lund | Nov. 9, 1937 |
| 2,204,708 | Smith | June 18, 1940 |
| 2,211,573 | McGrath | Aug. 13, 1940 |
| 2,246,138 | Lum | June 17, 1941 |
| 2,262,194 | Newton | Nov. 11, 1941 |
| 2,282,013 | Wetzsteon | May 5, 1942 |
| 2,284,674 | Murdock | June 2, 1942 |
| 2,304,642 | Hans | Dec. 8, 1942 |
| 2,315,906 | Stanford | Apr. 6, 1943 |